United States Patent
Xu et al.

(10) Patent No.: US 10,867,041 B2
(45) Date of Patent: *Dec. 15, 2020

(54) STATIC AND DYNAMIC SECURITY ANALYSIS OF APPS FOR MOBILE DEVICES

(71) Applicant: Palo Alto Networks, Inc., Santa Clara, CA (US)

(72) Inventors: Zhi Xu, Cupertino, CA (US); Xinran Wang, San Ramon, CA (US); Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,441

(22) Filed: Jun. 11, 2018

(65) Prior Publication Data
US 2018/0300483 A1   Oct. 18, 2018

Related U.S. Application Data

(63) Continuation of application No. 15/707,619, filed on Sep. 18, 2017, now Pat. No. 10,032,026, which is a continuation of application No. 13/954,815, filed on Jul. 30, 2013, now Pat. No. 9,811,665.

(51) Int. Cl.
*G06F 21/56* (2013.01)

(52) U.S. Cl.
CPC .......... *G06F 21/566* (2013.01); *G06F 21/562* (2013.01)

(58) Field of Classification Search
CPC ............. G06F 21/50; G06F 21/52–556; G06F 21/56–567; G06F 21/577
See application file for complete search history.

(56) References Cited

U.S. PATENT DOCUMENTS

| | | |
|---|---|---|
| 5,983,348 A | 11/1999 | Ji |
| 6,192,444 B1 | 2/2001 | White |
| 7,366,652 B2 | 4/2008 | Wang |
| 7,409,718 B1 | 8/2008 | Hong |
| 7,475,002 B1 | 1/2009 | Mann |

(Continued)

FOREIGN PATENT DOCUMENTS

| | | |
|---|---|---|
| WO | 2012134584 A1 | 10/2012 |
| WO | 2013067505 A1 | 5/2013 |

(Continued)

OTHER PUBLICATIONS

Blasing et al., An Android Application Sandbox System for Suspicious Software Detection, Malicious and Unwanted Software (Malware), 2010 5th International Conferences on IEEE, 2010.

(Continued)

*Primary Examiner* — Minh Dinh
(74) *Attorney, Agent, or Firm* — Van Pelt, Yi & James LLP

(57) ABSTRACT

Techniques for performing static and dynamic analysis on a mobile device application are disclosed. Static analysis is performed on a mobile device application using a static analysis engine. A set of static analysis results is generated. Dynamic analysis of the application is selectively customized based at least in part on a presence of a permission in the set of static analysis results. Dynamic analysis is performed using a dynamic analysis engine. A determination of whether the application is malicious is made based at least in part on the dynamic analysis.

23 Claims, 4 Drawing Sheets

(56) References Cited

U.S. PATENT DOCUMENTS

| | | | |
|---|---|---|---|
| 7,496,963 B2 | 2/2009 | Shipp | |
| 7,568,233 B1 | 7/2009 | Szor | |
| 7,603,713 B2 | 10/2009 | Belov | |
| 7,649,838 B2 | 1/2010 | Fishteyn | |
| 7,664,855 B1 | 2/2010 | Freed | |
| 7,779,472 B1* | 8/2010 | Lou | G06F 21/566 726/22 |
| 7,805,379 B1 | 9/2010 | Adkins, III | |
| 7,823,202 B1 | 10/2010 | Nucci | |
| 7,870,610 B1 | 1/2011 | Mitchell | |
| 7,930,273 B1 | 4/2011 | Clark | |
| 7,945,908 B1 | 5/2011 | Waldspurger | |
| 7,958,555 B1 | 6/2011 | Chen | |
| 8,011,010 B2 | 8/2011 | Michael | |
| 8,141,132 B2 | 3/2012 | Oliver | |
| 8,151,352 B1 | 4/2012 | Novitchi | |
| 8,201,246 B1 | 6/2012 | Wu | |
| 8,209,680 B1 | 6/2012 | Le | |
| 8,225,317 B1 | 7/2012 | Chiueh | |
| 8,239,492 B2 | 8/2012 | Pottenger | |
| 8,239,608 B1 | 8/2012 | Ginzton | |
| 8,260,914 B1 | 9/2012 | Ranjan | |
| 8,291,468 B1 | 10/2012 | Chickering | |
| 8,316,440 B1 | 11/2012 | Hsieh | |
| 8,321,936 B1 | 11/2012 | Green | |
| 8,347,100 B1 | 1/2013 | Thornewell | |
| 8,359,651 B1 | 1/2013 | Wu | |
| 8,364,664 B2 | 1/2013 | Bennett | |
| 8,370,938 B1 | 2/2013 | Daswani | |
| 8,402,529 B1 | 3/2013 | Green | |
| 8,402,543 B1 | 3/2013 | Ranjan | |
| 8,407,324 B2 | 3/2013 | McDougal | |
| 8,438,639 B2 | 5/2013 | Lee | |
| 8,443,363 B1 | 5/2013 | Brennan, III | |
| 8,443,449 B1 | 5/2013 | Fan | |
| 8,464,341 B2 | 6/2013 | Cohen | |
| 8,479,295 B2 | 7/2013 | Sahita | |
| 8,484,732 B1 | 7/2013 | Chen | |
| 8,484,739 B1 | 7/2013 | Seshadri | |
| 8,495,742 B2 | 7/2013 | Abadi | |
| 8,510,827 B1 | 8/2013 | Leake | |
| 8,516,591 B2 | 8/2013 | Fly | |
| 8,521,667 B2 | 8/2013 | Zhu | |
| 8,533,842 B1 | 9/2013 | Satish | |
| 8,539,577 B1 | 9/2013 | Stewart | |
| 8,566,928 B2 | 10/2013 | Dagon | |
| 8,566,946 B1 | 10/2013 | Aziz | |
| 8,572,740 B2 | 10/2013 | Mashevsky | |
| 8,578,481 B2 | 11/2013 | Rowley | |
| 8,584,239 B2 | 11/2013 | Aziz | |
| 8,631,489 B2 | 1/2014 | Antonakakis | |
| 8,646,071 B2 | 2/2014 | Pereira | |
| 8,646,088 B2 | 2/2014 | Pistoia | |
| 8,656,491 B1 | 2/2014 | Daswani | |
| 8,677,487 B2 | 3/2014 | Balupari | |
| 8,683,584 B1 | 3/2014 | Daswani | |
| 8,707,441 B1 | 4/2014 | Cidambi | |
| 8,726,386 B1* | 5/2014 | McCorkendale | G06F 21/554 726/22 |
| 8,756,691 B2 | 6/2014 | Nachenberg | |
| 8,763,071 B2 | 6/2014 | Sinha | |
| 8,763,125 B1 | 6/2014 | Feng | |
| 8,806,647 B1* | 8/2014 | Daswani | H04L 63/1425 726/25 |
| 8,813,240 B1 | 8/2014 | Northup | |
| 8,826,426 B1 | 9/2014 | Dubey | |
| 8,838,570 B1 | 9/2014 | English | |
| 8,863,288 B1 | 10/2014 | Savage | |
| 8,893,124 B2 | 11/2014 | Bork | |
| 8,931,088 B2 | 1/2015 | Chen | |
| 8,966,625 B1 | 2/2015 | Zuk | |
| 9,003,526 B2 | 4/2015 | El-Moussa | |
| 9,049,221 B1 | 6/2015 | Yen | |
| 9,117,079 B1 | 8/2015 | Huang | |
| 9,141,801 B2 | 9/2015 | Moon | |
| 9,152,694 B1 | 10/2015 | Padidar | |
| 9,165,142 B1 | 10/2015 | Sanders | |
| 9,183,383 B1 | 11/2015 | Yablokov | |
| 9,213,838 B2 | 12/2015 | Lu | |
| 9,223,962 B1 | 12/2015 | Kashyap | |
| 9,245,121 B1 | 1/2016 | Luo | |
| 9,294,486 B1 | 3/2016 | Chiang | |
| 9,317,680 B2 | 4/2016 | Carter, III | |
| 9,361,089 B2 | 6/2016 | Bradfield | |
| 9,516,039 B1 | 12/2016 | Yen | |
| 9,516,053 B1 | 12/2016 | Muddu | |
| 9,519,781 B2 | 12/2016 | Golshan | |
| 9,591,003 B2 | 3/2017 | Johansson | |
| 9,626,509 B1* | 4/2017 | Khalid | G06F 21/53 |
| 9,792,430 B2 | 10/2017 | Golshan | |
| 9,852,290 B1 | 12/2017 | Kirk | |
| 9,894,096 B1 | 2/2018 | Daswani | |
| 10,019,575 B1 | 7/2018 | Wang | |
| 10,445,216 B2 | 10/2019 | Mola | |
| 10,534,687 B2 | 1/2020 | Fahim | |
| 10,534,749 B1 | 1/2020 | Miah | |
| 2003/0191911 A1 | 10/2003 | Kleinschnitz | |
| 2004/0030913 A1 | 2/2004 | Liang | |
| 2004/0107416 A1 | 6/2004 | Buban | |
| 2004/0133796 A1 | 7/2004 | Cohen | |
| 2005/0149726 A1 | 7/2005 | Joshi | |
| 2005/0177602 A1 | 8/2005 | Kaler | |
| 2005/0240756 A1 | 10/2005 | Mayer | |
| 2005/0283837 A1 | 12/2005 | Olivier | |
| 2006/0021029 A1 | 1/2006 | Brickell | |
| 2006/0168024 A1 | 7/2006 | Mehr | |
| 2007/0039053 A1 | 2/2007 | Dvir | |
| 2007/0050850 A1 | 3/2007 | Katoh | |
| 2007/0055711 A1 | 3/2007 | Polyakov | |
| 2007/0079375 A1 | 4/2007 | Copley | |
| 2007/0106986 A1 | 5/2007 | Worley, Jr. | |
| 2007/0174915 A1 | 7/2007 | Gribble | |
| 2007/0192857 A1 | 8/2007 | Ben-Itzhak | |
| 2007/0219772 A1 | 9/2007 | Kfir | |
| 2007/0261112 A1 | 11/2007 | Todd | |
| 2008/0016552 A1 | 1/2008 | Hart | |
| 2008/0127338 A1 | 5/2008 | Cho | |
| 2008/0155694 A1 | 6/2008 | Kwon | |
| 2008/0177755 A1 | 7/2008 | Stern | |
| 2008/0177994 A1 | 7/2008 | Mayer | |
| 2008/0209562 A1 | 8/2008 | Szor | |
| 2008/0229393 A1 | 9/2008 | Congdon | |
| 2008/0256633 A1 | 10/2008 | Arnold | |
| 2008/0262991 A1 | 10/2008 | Kapoor | |
| 2008/0263658 A1 | 10/2008 | Michael | |
| 2008/0263659 A1 | 10/2008 | Alme | |
| 2008/0320594 A1 | 12/2008 | Jiang | |
| 2009/0007100 A1 | 1/2009 | Field | |
| 2009/0019547 A1 | 1/2009 | Palliyil | |
| 2009/0036111 A1 | 2/2009 | Danford | |
| 2009/0055928 A1 | 2/2009 | Kang | |
| 2009/0077383 A1 | 3/2009 | De Monseignat | |
| 2009/0144826 A2 | 6/2009 | Piccard | |
| 2009/0150419 A1 | 6/2009 | Kim | |
| 2009/0235357 A1 | 9/2009 | Ebringer | |
| 2009/0241190 A1 | 9/2009 | Todd | |
| 2009/0254989 A1 | 10/2009 | Achan | |
| 2009/0265786 A1 | 10/2009 | Xie | |
| 2009/0282485 A1 | 11/2009 | Bennett | |
| 2009/0288167 A1 | 11/2009 | Freericks | |
| 2010/0037314 A1 | 2/2010 | Perdisci | |
| 2010/0043072 A1 | 2/2010 | Rothwell | |
| 2010/0077481 A1 | 3/2010 | Polyakov | |
| 2010/0107252 A1 | 4/2010 | Mertoguno | |
| 2010/0115586 A1 | 5/2010 | Raghavan | |
| 2010/0154059 A1 | 6/2010 | McNamee | |
| 2010/0162350 A1 | 6/2010 | Jeong | |
| 2010/0175132 A1 | 7/2010 | Zawadowskiy | |
| 2010/0281458 A1 | 11/2010 | Paladino | |
| 2010/0333168 A1 | 12/2010 | Herrod | |
| 2011/0041179 A1 | 2/2011 | Staahlberg | |
| 2011/0055923 A1 | 3/2011 | Thomas | |
| 2011/0090911 A1 | 4/2011 | Hao | |
| 2011/0099620 A1 | 4/2011 | Stavrou | |

(56) References Cited

U.S. PATENT DOCUMENTS

| | | |
|---|---|---|
| 2011/0161955 A1 | 6/2011 | Woller |
| 2011/0167495 A1 | 7/2011 | Antonakakis |
| 2011/0173698 A1 | 7/2011 | Polyakov |
| 2011/0185425 A1 | 7/2011 | Lee |
| 2011/0208714 A1 | 8/2011 | Soukal |
| 2011/0239299 A1 | 9/2011 | Chen |
| 2011/0252474 A1 | 10/2011 | Ward |
| 2011/0271342 A1 | 11/2011 | Chung |
| 2011/0276695 A1 | 11/2011 | Maldaner |
| 2011/0283360 A1 | 11/2011 | Abadi |
| 2011/0296412 A1 | 12/2011 | Banga |
| 2011/0296486 A1 | 12/2011 | Burch |
| 2012/0042381 A1 | 2/2012 | Antonakakis |
| 2012/0054869 A1 | 3/2012 | Yen |
| 2012/0079596 A1 | 3/2012 | Thomas |
| 2012/0084860 A1 | 4/2012 | Cao |
| 2012/0089700 A1 | 4/2012 | Safruti |
| 2012/0096549 A1 | 4/2012 | Amini |
| 2012/0110174 A1 | 5/2012 | Wootton |
| 2012/0117650 A1 | 5/2012 | Nachenberg |
| 2012/0117652 A1 | 5/2012 | Manni |
| 2012/0192274 A1 | 7/2012 | Odom |
| 2012/0233691 A1 | 9/2012 | Jiang |
| 2012/0240183 A1 | 9/2012 | Sinha |
| 2012/0240224 A1 | 9/2012 | Payne |
| 2012/0255018 A1 | 10/2012 | Sallam |
| 2012/0255019 A1 | 10/2012 | McNamee |
| 2012/0255021 A1 | 10/2012 | Sallam |
| 2012/0255031 A1 | 10/2012 | Sallam |
| 2012/0278889 A1 | 11/2012 | El-Moussa |
| 2012/0291042 A1 | 11/2012 | Stubbs |
| 2012/0291131 A1 | 11/2012 | Turkulainen |
| 2013/0007245 A1 | 1/2013 | Malik |
| 2013/0014259 A1 | 1/2013 | Gribble |
| 2013/0047147 A1 | 2/2013 | McNeill |
| 2013/0055394 A1 | 2/2013 | Beresnevichiene |
| 2013/0091350 A1 | 4/2013 | Gluck |
| 2013/0091570 A1 | 4/2013 | McCorkendale |
| 2013/0091571 A1 | 4/2013 | Lu |
| 2013/0104230 A1 | 4/2013 | Tang |
| 2013/0117848 A1 | 5/2013 | Golshan |
| 2013/0117852 A1 | 5/2013 | Stute |
| 2013/0122861 A1 | 5/2013 | Kim |
| 2013/0145002 A1 | 6/2013 | Kannan |
| 2013/0145008 A1 | 6/2013 | Kannan |
| 2013/0152200 A1 | 6/2013 | Alme |
| 2013/0160130 A1 | 6/2013 | Mendelev |
| 2013/0191915 A1 | 7/2013 | Antonakakis |
| 2013/0212684 A1 | 8/2013 | Li |
| 2013/0227165 A1 | 8/2013 | Liu |
| 2013/0232574 A1 | 9/2013 | Carothers |
| 2013/0246685 A1 | 9/2013 | Bhargava |
| 2013/0298184 A1 | 11/2013 | Ermagan |
| 2013/0298192 A1 | 11/2013 | Kumar |
| 2013/0298230 A1 | 11/2013 | Kumar |
| 2013/0298242 A1 | 11/2013 | Kumar |
| 2013/0298243 A1 | 11/2013 | Kumar |
| 2013/0298244 A1 | 11/2013 | Kumar |
| 2013/0326625 A1 | 12/2013 | Anderson |
| 2013/0347094 A1* | 12/2013 | Bettini .................. G06F 21/577 726/11 |
| 2014/0006734 A1 | 1/2014 | Li |
| 2014/0059641 A1 | 2/2014 | Chapman, II |
| 2014/0096131 A1 | 4/2014 | Sonnek |
| 2014/0130158 A1 | 5/2014 | Wang |
| 2014/0189862 A1 | 7/2014 | Kruglick |
| 2014/0283037 A1 | 9/2014 | Sikorski |
| 2014/0337836 A1* | 11/2014 | Ismael .................... G06F 21/56 718/1 |
| 2014/0351935 A1 | 11/2014 | Shao |
| 2014/0380474 A1 | 12/2014 | Paithane |
| 2015/0047033 A1 | 2/2015 | Thomas |
| 2015/0058984 A1 | 2/2015 | Shen |
| 2015/0067673 A1 | 3/2015 | Wang |
| 2015/0067862 A1 | 3/2015 | Yu |
| 2015/0074810 A1 | 3/2015 | Saher |
| 2015/0096025 A1 | 4/2015 | Ismael |
| 2015/0195299 A1 | 7/2015 | Zoldi |
| 2015/0199207 A1 | 7/2015 | Lin |
| 2016/0036836 A1 | 2/2016 | Grill |
| 2016/0099951 A1 | 4/2016 | Kashyap |
| 2016/0342787 A1 | 11/2016 | Wang |
| 2017/0093910 A1 | 3/2017 | Gukal |
| 2017/0323102 A1 | 11/2017 | Manadhata |
| 2020/0019424 A1 | 1/2020 | Wang |

FOREIGN PATENT DOCUMENTS

| | | |
|---|---|---|
| WO | 2013067508 | 5/2013 |
| WO | 2013134206 A1 | 9/2013 |

OTHER PUBLICATIONS

Min et al., Runtime-Based Behavior Dynamic Analysis System for Android Malware Detection, Atlantis Press, ICCIA 2012, Dec. 2012.

Rastogi et al., AppsPlayground: Automatic Security Analysis of Smartphone Applications, ACM, Feb. 2013.

Spreitzenbarth et al., "Mobile-Sandbox: Having a Deeper Look into Android Applications", from Proceedings of the 28th Annual ACM Symposium on Applied Computing, pp. 1808-1815, Mar. 2013.

Zhou et al., Dissecting Android Malware: Characterization and Evolution, IEEE, 2012.

Landecki, Grzegorz, Detecting Botnets, Linux Journal, Jan. 1, 2009.

Lau et al., 'Measuring Virtual Machine Detection in Malware using DSD Tracer', Sophoslabs, Journal in Computer Virology, Aug. 2008.

Li et al., "DroidBot: A Lightweight UI-Guided Test Input Generator for Android", 2017.

Ligh et al., 'Chapter 5: Researching Domains and IP Addresses,' Malware Analyst's Cookbook, John Wiley & Sons, Nov. 2010, 38 pages.

Lindorfer et al., 'Detecting Enviroment-Sensitive Malware', Recent Advances in Intrusion Detection. Springer Berlin Heidelberg, Jan. 2011.

Liu et al., An Automatic UI Interaction Script Generator for Android Applications Using Activity Call Graph Analysis. Eurasia Journal of Mathematics, Science and Technology Education, 14(7), 3159-3179. 2018.

Livadas et al., Using Machine Learning Techniques to Identify Botnet Traffic, BBN Technologies, Nov. 2006.

Nazario et al., As the Net Churns: Fast-Flux Botnet Observations, IEEE, pp. 24-31, Sep. 5, 2008.

Paul Royal, Analysis of the Kraken Botnet, Damballa, Apr. 9, 2008.

Rajab et al., 'A Multifaceted Approach to Understanding the Botnet Phenonmenon,' Proceedings of the 6th ACM Sigcomm Conference on Internet Measurement, Oct. 2006, 12 pages.

Ramachandran, Anirudh et al., Revealing Botnet Membership Using DNSBL Counter-Intelligence, Jul. 7, 2006.

Russ White, 'High Availability in Routing', Mar. 2004, Cisco Systems, vol. 7, Issue 1, pp. 2-14.

Schechter et al., 'Fast Detection of Scanning Worm Infections,' Recent Advances in Intrusion Detection: 7th International Symposium RAID 2004 Proceedings, Jan. 2004, 24 pages.

Shabtai et al., Andromaly: A Behavioral Malware Detection Framework for Android Devices, J Intell Int Syst (2012) 38:161-190, Springer, Jan. 6, 2011.

Sikorski et al., 'Chapter 14: Malware-Focused Network Signatures,' Practical Malware Anlaysis, No Starch Press, Feb. 2012, 13 pages.

Singh et al., 'Hot Knives Through Butter: Evading File-based Sandboxes', FireEye, Inc., Feb. 2014.

Strayer et al. Detecting Botnets with Tight Command and Control, BBN Technologies, 2006.

Sun et al, Malware Virtualization-resitant behavior detection, 2011 IEEE, pp. 912-917.

Sylve et al., "Acquisition and analysis of volatile memory from android devices." Digital Investigation 8.3-4, pp. 175-184. 2012.

(56) References Cited

OTHER PUBLICATIONS

Van Der Heide et al., 'DNS Anomaly Detection,' System and Network Engineering Research Group, University of Amsterdam, Feb. 6, 2011, 20 pages.
Wagener et al., 'An Instrumented Analysis of Unknown Software and Malware Driven by Free Libre Open Source Software', Signal Image Technology and Internet Based Systems, 2008. SITIS'08. IEEE International Conference on. IEEE, Nov. 2008.
Yadav et al., 'Detecting Algorithmically Generated Malicious Domain Names', Nov. 2010.
Yen, Ting-Fang et al., Traffic Aggregation for Malware Detection, Jul. 2008.
Zang et al., Botnet Detection Through Fine Flow Classification, CSE Dept., Technical Report No. CSE11-001, p. 1-17, Jan. 31, 2011.
Zheng et al., "SmartDroid: an Automatic System for Revealing UI-based Trigger Conditions in Android Applications", Oct. 19, 2012.
Zou et al., Detecting Malware Based on DNS Graph Mining, Hindawi Publishing Corporation, International Journal of Distributed Sensor Networks, vol. 2015, pp. 1-12, Apr. 17, 2015.
Author Unknown, A Day in the Life of a BotArmy, Damballa, 2008.
Author Unknown, Advanced Persistent Threats (APT), What's an APT? A Brief Definition, Damballa, Dec. 14, 2010.
Author Unknown, Anatomy of a Targeted Attack, Damballa, Dec. 3, 2008.
Author Unknown, AV, IDS/IPS and Damballa's Response to Targeted Attacks, A Technology Comparison, Damballa, Nov. 2008.
Author Unknown, Closed Window, How Failsafe Enhancements Dramatically Limit Opportunities for Malware Armies and other Targeted Attacks, Damballa, Sep. 23, 2009.
Author Unknown, Damballa: A Different Approach, Targeted Attacks Requires a New Solution, Damballa, Sep. 23, 2008.
Author Unknown, Damballa's In-The-Cloud Security Model, Enterprise Protection Moves Beyond the Network Perimeter, Damballa, Aug. 24, 2008.
Author Unknown, Executive Overview, the Command Structure of the Aurora Botnet, Damballa, Mar. 2010.
Author Unknown, FireEye Malware Analysis, FireEye.com, FireEye, Inc., 2010.
Author Unknown, How to be a Hero in the War Against BotArmies, Damballa, 2008.
Author Unknown, 'Hybrid Sandboxing for Detecting and Analyzing Advanced and Unknown Malware', Blue Coat Systems, Inc., Nov. 2013.
Author Unknown, Layer 8, How and Why Targeted Attacks Exploit Your Users, Damballa, Nov. 2011.
Author Unknown, 'Multi-Vector Virtual Execution (MVX) Engine', FireEye, Inc., http://www.fireeye.com/products-and-solutionsivirtual-execution-engine.html, Jun. 2014.
Author Unknown, Targeted Attacks for Fun and Profit, an Executed Guide to a New and Growing Enterprise Threat, Damballa, Oct. 13, 2008.
Author Unknown, Trust Betrayed, What to Do When a Targeted Attack Turns Your Networks Against You, Damballa, Feb. 22, 2008.
Author Unknown, Updated on the Enemy, a Deconstruction of Who Profits From Botnets, Damballa, May 13, 2009.
Barr, The VMware Mobile Virtualization Platform: Is that a Hypervisor in your Pocket?, Dec. 2010, VMware, p. 124-135.
Binkley et al., An Algorithm for Anomaly-based Botnet Detection, Jul. 2006.
Chen et al., Chapter 4: Guarding Against Network Intrusions, Network and System Security, Elsevier Inc., Feb. 2009, 5 pages.
Chen et al., Software-Defined Mobile Networks Security, Mobile Netw Appl, (2016), 21:729-743, Jan. 9, 2016.
Davidoff et al., 'Chapter 12: Malware Forensics,' Network Forensics: Tracking Hackers Through Cyberspace, Pearson Education Inc., Jun. 2012, 60 pages.
Dittrich et al., P2P as Botnet Command and Control; a Deeper Insight, 2008 3rd International Conference on Malicious and Unwanted Software (Malware), Oct. 2008, IEEE, vol. 10, pp. 41-48.
Giroire et al., Exploiting Temporal Persistence to Detect Convert Botnet Channels, Sep. 2009.
Goebel et al., Rishi: Identify Bot Contaminated Hosts by IRC Nickname Evaluation, Apr. 2007.
Gu et al., BotHunter: Detecting Malware Infection Through IDS-Driven Dialog Correlation, Aug. 2007.
Gu et al., BotMiner: Clustering Analysis of Network Traffic for Protocol- and Structure-Independent Botnet Detection, Jul. 2008.
Gu et al., BotSniffer: Detecting Botnet Command and Control Channels in Network Traffic, Feb. 2008.
Gunter Ollmann, Botnet Communication Topologies, Understanding the Intricacies of Bonet Command and Control, Damballa, Jun. 2009.
Gunter Ollmann, Extracting CnC from Malware, the Role of malware Sample Analysis in Botnet Detection, Damballa, Dec. 8, 2009.
Gunter Ollmann, Serial Variant Evasion Tactics, Techniques Used to Automatically Bypass Antivirus Technologies, Damballa, Oct. 7, 2009.
Gunter Ollmann, The Botnet vs. Malware Relationship, the One to one Botnet Myth, Damballa, Jun. 2009.
Gunter Ollmann, The Opt-IN Botnet Generation, Hacktivism and Centrally Controlled Protesting, Social Networks, Damballa, Apr. 26, 2010.
Karagiannis et al., BLINC: Multilevel Traffic Classification in the Dark, ACM Sigcomm Computer Communication Review, Retrieved From https://www.microsoft.com/en-us/research/wp-content/uploads/2016/02/BLINC_TR.pdf, published 2005.
Karasaridis, Anestis et al., Wide-scale Botnet Detection and Characterization, Dec. 14, 2010.
Yadav et al., Detecting Algorithmically Generated Domain-Flux Attacks with DNS Traffic Analysis, 2012, pp. 1-15.

* cited by examiner

STATIC AND DYNAMIC SECURITY ANALYSIS OF APPS FOR MOBILE DEVICES

CROSS REFERENCE TO OTHER APPLICATIONS

This application is a continuation of U.S. patent application Ser. No. 15/707,619 entitled STATIC AND DYNAMIC SECURITY ANALYSIS OF APPS FOR MOBILE DEVICES filed Sep. 18, 2017, which is a continuation of U.S. patent application Ser. No. 13/954,815, now U.S. Pat. No. 9,811,665 entitled STATIC AND DYNAMIC SECURITY ANALYSIS OF APPS FOR MOBILE DEVICES filed Jul. 30, 2013 both of which are incorporated herein by reference for all purposes.

BACKGROUND OF THE INVENTION

Individuals are increasingly spending more time using mobile devices and less time using traditional computers. This shift in usage is present both in personal and in business contexts. For example, employees of companies are increasingly using mobile devices for their work related activities. In conjunction with this shift in user behavior, nefarious individuals and organizations are increasingly targeting mobile devices with malicious applications ("malware"). Unfortunately, it can be difficult to protect mobile devices using existing techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
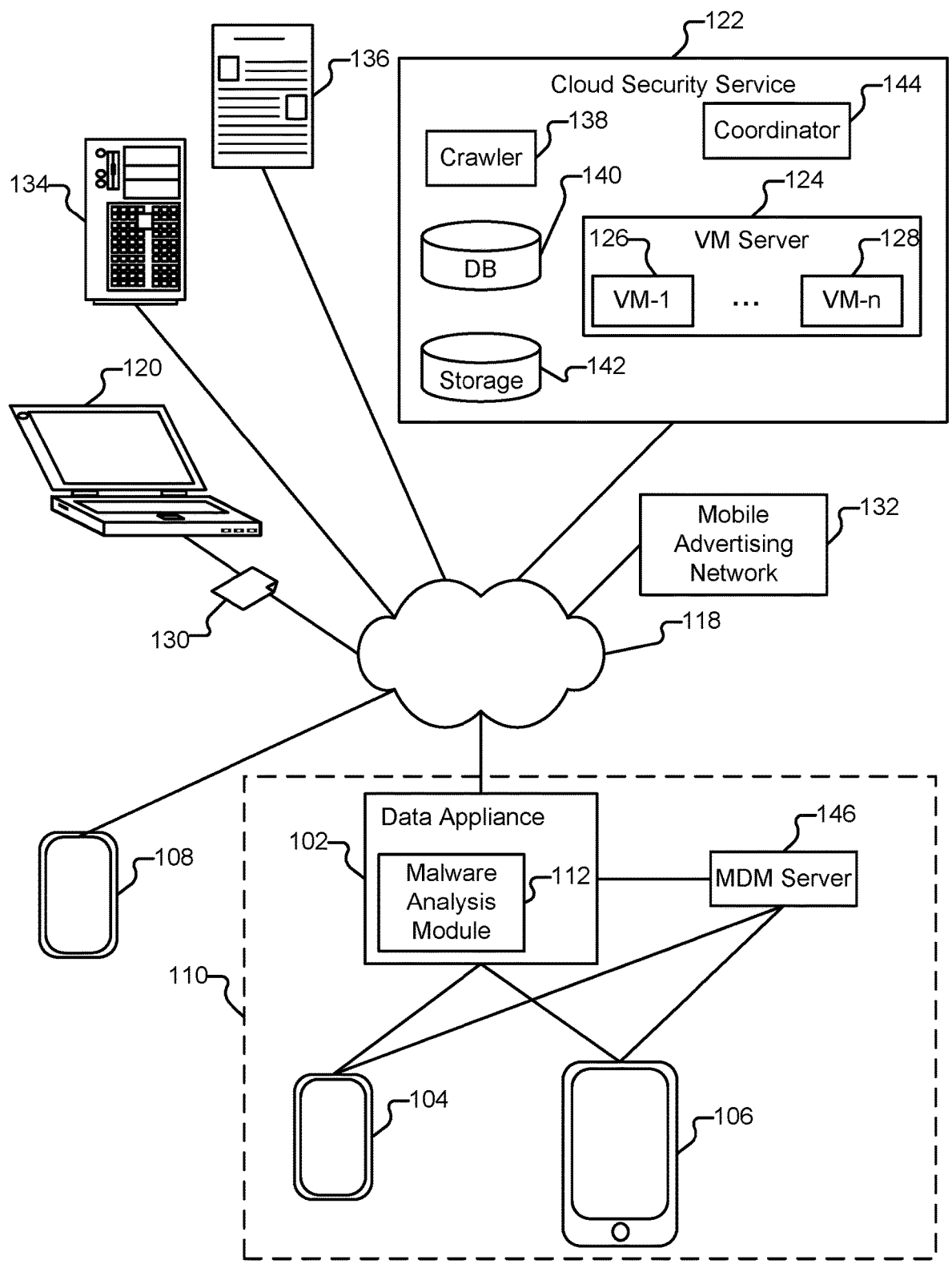
FIG. 1 illustrates an example of an environment in which mobile malware is detected and prevented from causing harm.

FIG. 1 illustrates an example of an environment in which malicious mobile applications (malware) are detected and prevented from causing harm. The term "application" is used throughout the Specification to collectively refer to programs, bundles of programs, manifests, packages, etc., irrespective of form/platform. Further, "malware" as used herein refers to an "application" that engages in behaviors, whether clandestinely or not, of which a user does not approve/would not approve if fully informed (whether illegal or not). Examples of malware include viruses, rootkits, spyware, keyloggers, spyware, etc. One particular example of mobile malware is a malicious .apk file that appears to an end user to be a free game, but stealthily sends SMS premium messages (e.g., costing $10 each), running up the end user's phone bill. Another example of mobile malware is an application that stealthily collects the user's contacts and sends them to a spammer. Yet another example of mobile malware is an application that collects and reports to a remote server the end user's location (but does not offer a location based service to the user, such as a mapping service). Other forms of mobile malware can also be detected/thwarted using the techniques described herein.

Suppose a nefarious individual wishes to propagate mobile malware (such as malware 130) via system 120 to end users. A variety of approaches can be used by the nefarious individual. As one example, the individual can upload mobile malware 130 to a software distribution platform such as platform 134 (also referred to as an "an app store"). The nefarious individual hopes that unsuspecting users of platform 134 (e.g., any of applicable client devices 104-108) will download the malicious application 130 from platform 134 and install it on their devices. Example embodiments of platform 134 include Google Play, the iOS App Store, BlackBerry World, the Windows Phone Store, and the Amazon Appstore. Additional examples of software distribution platforms include third third party software distribution platforms, such as the Baidu App Store, GetJar, and Handango. Another way the nefarious individual can attempt to propagate mobile malware is by posting it on a message/forum site, such as site 136. In this scenario, the nefarious individual again hopes that unsuspecting users of site 136 will download and install the malicious application 130. Yet another way for the nefarious individual to attempt to propagate mobile malware 130 is to attach it to an email message and hope that the recipient (e.g., the owner of device 104) will open the attachment and install the program. Yet another way for the nefarious individual to attempt to propagate mobile malware 130 is to include it in an advertising company's ad network (e.g., mobile ad network 132) and hope that the user will install the promoted program.

In the example shown in FIG. 1, client devices 104-106 are a smartphone and a tablet (respectively) present in an enterprise network 110. Client device 108 is outside enterprise network 110. As shown, client device 104 runs an Android-based operating system, and client device 106 runs a version of iOS. Client device 108 is a smartphone that runs Windows Mobile OS. Each of the devices shown can be protected using techniques described herein. Other devices running other mobile operating systems can also be protected using the techniques described herein.

Data appliance 102 is configured to enforce policies regarding communications between clients such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110. In some embodiments, other devices are included in network 110, such as a mobile device management (MDM) server 146, which is in communication with data appliance 102. As shown, MDM server 146 communicates with mobile devices (e.g., 104, 106) to determine device status and to report (e.g., periodically) such mobile device status information to data appliance 102. MDM can be configured to report the presence of malicious applications installed on devices such as device 104/106, and/or can be configured to receive indications of which mobile applications are malicious (e.g., from appliance 102, from service 122, or combinations thereof). In some embodiments, data appliance 102 is configured to enforce polices against devices 104 and 106 based on information received from MDM server 146. For example, if device 106 is determined to have malware installed on it, data appliance 102 (working in cooperation with MDM server 146) can deny client 106 access to certain enterprise resources (e.g., an Intranet) while allowing device 104 (which does not have malware installed upon it) access to the resources.

Figure 2:
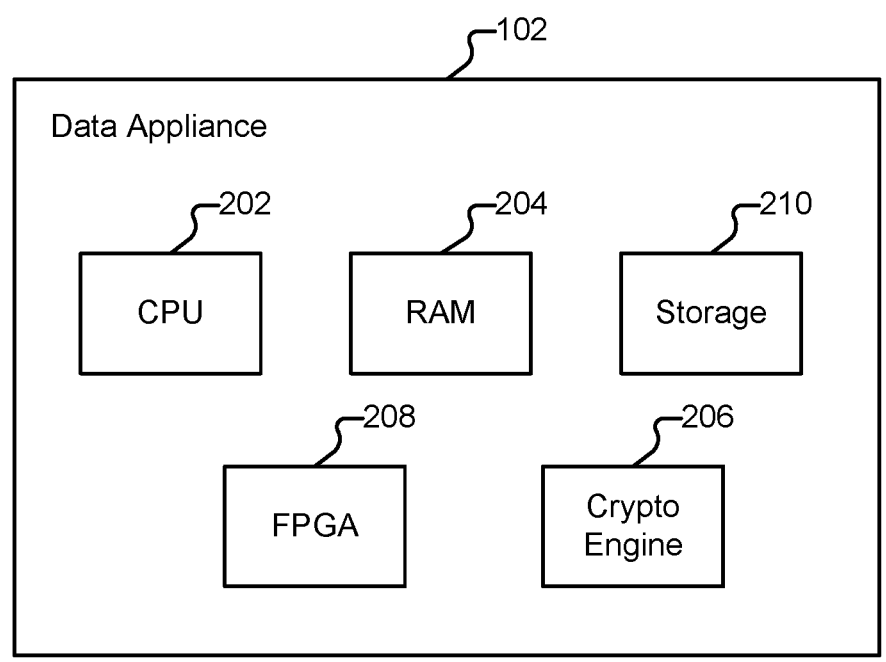
FIG. 2 illustrates an embodiment of a data appliance.

An embodiment of a data appliance is shown in FIG. 2. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a single, dedicated device (e.g., as shown), and can also be a set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 (or client 106) by an agent or other software executing at least partially on client 104 (or client 106).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Suppose data appliance 102 intercepts an email sent by system 120 to device 104 to which a copy of malware 130 has been attached. (As an alternate, but similar scenario, data appliance 102 could intercept an attempted download by device 104 of malware 130 from platform 134 or site 136). Data appliance 102 determines whether a signature for the attachment (i.e., malware 130) is present on data appliance 102. A signature, if present, can indicate that the attachment is known to be safe, and can also indicate that the attachment is known to be malicious. If no signature for the attachment is found, in some embodiments, data appliance 102 is configured to provide the attachment (malware 130) to a mobile malware analysis module 112 for real-time analysis. As will be described in more detail below, a combination of static and dynamic analysis can be performed on the application to determine whether it is malicious.

As mentioned above, the analysis of malware 130 can be performed on premise. For example, the analysis can be performed by a malware analysis module 112 included in data appliance 102. Instead of or in addition to on-premise analysis, appliance 102 can also send a copy of malware 130 to cloud security service 122 for analysis. Further, cloud security service 122 can also (or instead) obtain copies of mobile applications for evaluation from sources other than data appliance 102. As one example, cloud security service 122 can include a crawler 138 configured to periodically crawl platform 134 and/or site 136, looking for new or updated applications. Such applications (an example of which is malware 130) can then be analyzed by cloud security service 122. In some embodiments, platform 134 and/or site 136 make copies of applications available to cloud security service 122 via an Application Programming Interface (API) made available by service 122, instead of or in addition to crawler 138 obtaining such copies.

Copies of received applications (i.e., awaiting analysis) are stored in storage 142 and analysis is commenced (or scheduled, as applicable). As will be described in more detail below, results of the analysis (and additional information pertaining to the applications) are stored in database 140. Cloud security service 122 can comprise one or more dedicated commercially available hardware servers (e.g., having multi-core processor(s), 8G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, virtual machine server 124 is configured to provide one or more virtual machines 126-128 for emulating mobile devices. The virtual machines can execute a variety of operating systems and/or versions thereof. Observed behaviors resulting from executing mobile applications in the virtual machines are logged and analyzed for indications that the application is malicious. In some embodiments the log analysis is performed by the VM server (e.g., VM server 124). In other embodiments, the analysis is performed at least in part by other components of service 122, such as coordinator 144.

In some embodiments, cloud security service 122 makes available the results of its analysis of mobile applications via a list of signatures (and/or other identifiers) to appliance 102 (and/or to MDM server 146) as part of a subscription. For example, service 122 can send a content package that identifies malware apps periodically (e.g., daily, hourly, or some other interval, and/or based on an event based on a policy). An example content package includes a listing of identified malware apps (e.g., information in the content package can include an app package name, an app hash code for uniquely identifying the app, and a malware name for each identified malware app). The subscription can cover the analysis of just those files intercepted by data appliance 102 and sent to cloud security service 122 by data appliance 102, and can also cover signatures of all malware known to cloud security service 122 (or subsets thereof, such as just mobile malware but not other forms of malware (e.g., PDF malware)). Further, in some embodiments, cloud security service 122 is configured to provide security services to entities in addition to or instead of an operator of data appliance 102. For example, a carrier providing cellular service to device 108 can contract with cloud security service 122 to analyze applications which device 108 attempts to download. As another example, the owner of device 108 can contract with cloud security service 122 to analyze applications. As yet another example, an operator of app store 134, and/or an operator of site 136 can contract with cloud security service 122 to analyze mobile applications (e.g., for a fee).

In the event malware 130 is determined to be malicious (whether by cloud security service 122 or by data appliance 102), appliance 102 can be configured to automatically block the file download based on the analysis result. Further, a signature can be generated for malware 130 and distributed (e.g., to other data appliances) to automatically block future file transfer requests to download the file determined to be malicious.

Analyzing Mobile Applications

Figure 3:
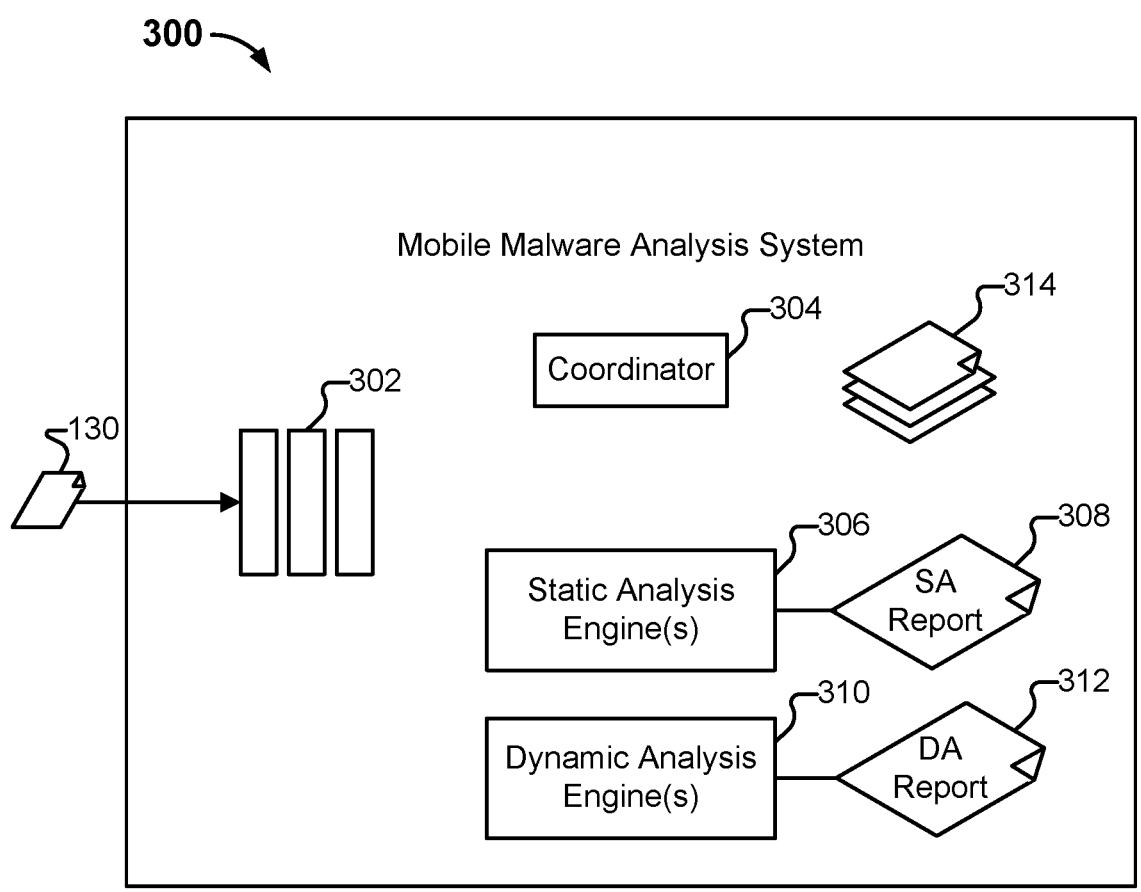
FIG. 3 illustrates an example of logical components included in a system for performing static and dynamic analysis on a mobile device application.

FIG. 3 illustrates an example of logical components included in a system for performing static and dynamic analysis on a mobile device application. As explained above, system 300 can be implemented using a single device. For example, the functionality of system 300 can be implemented on data appliance 102 which includes an analysis module 112. System 300 can also be implemented, collectively, across multiple distinct devices. For example, the functionality of system 300 can be provided by cloud security service 122.

As will be described in more detail below, system 300 is configured to perform a hybrid, two part analysis on mobile device applications. First, static analysis is performed, in part to check the capabilities of the application (e.g., its potential avenues for being malicious). Then, dynamic analysis is performed to check whether the application actually uses the capabilities maliciously. The hybrid approach helps improve the accuracy of mobile malware detection, while lowering the false positive rate of mislabeling benign application files as malware (e.g., due to harmless but poor programming techniques on the part of the application's author). A final verdict pertinent to the application can be made based on both the application's content (e.g., where the application includes a URL verified to be a malicious website), and on the context in which it behaves (e.g., whether the usage of a suspicious capability is made aware to an end user or is performed silently in the background).

In various embodiments, system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or service 122). Examples of information included in collection 314 are: URLs of known malicious websites; URLs of known safe websites; signatures, hashes, and/or other identifiers of known malicious applications; and signatures, hashes, and/or other identifiers of known safe applications; and signatures, hashes, and/or other identifiers of known malicious files (e.g. Android exploits files).

Ingestion

In some embodiments, when a new mobile application is received for analysis (e.g., an existing signature associated with the mobile application is not present in system 300), it is added to processing queue 302. In the following example, suppose the application is called "game.apk," (the malicious game 130) but that it is not yet known whether or not the game is malicious. As explained above, a mobile application for analysis can be received in a variety of ways. As one example, a mobile application can be received by data appliance 102 for analysis when data appliance 102 intercepts an email or other data transmission intended for device 104 that includes the application. Additional examples of the receipt of a mobile application include: (1) receipt by service 122 of the application from data appliance 102, platform 134, or site 136 for analysis (e.g., via an API), and (2) crawling by service 122 of systems such as platform 134 or site 136.

Static Analysis

Coordinator 304 monitors the queue, and as resources (e.g., a static analysis worker) become available, coordinator 304 fetches an application from queue 302 for processing (e.g., fetches game.apk). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306).

One example of how static analysis can be performed, using game.apk (an Android application) as an example is as follows. Similar approaches can be used for mobile applications on other platforms. First, the static analysis engine 306 uses a tool, such as Android apktool, to reverse game.apk into an intermediate source code form. The output of the reversing operation is, in some embodiments, a set of .smali files—the direct output of the disassembly from Java virtual machine language, and other resources files included in the game.apk file.

The static analysis engine obtains general information about the application, and includes it (along with heuristic information described below) in a static analysis report 308. The report can be created by the static analysis engine, or by coordinator 304 (or by another appropriate component) which can be configured to receive the information from static analysis engine 306. In some embodiments, the collected information is stored in a database record for the application (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). The static analysis engine also collects and stores information pertaining to the running context of the application, such as: the minimum version of the Android OS required to run the application (the minimum SDK version), and the sensors it will have access to.

The static analysis engine also retrieves (e.g., from database 140) a set of heuristic rules to be applied on the .smali code and the resource files. In particular, static analysis engine 306 determines which rules are triggered (also referred to as "features hit") by the source code. Examples of features include the following (where an example of "the received APK" is "game.apk"):

1. "Contain APK file": If the received APK contains other APK files within the package, the received APK is suspicious.

2. "Contain Know Malicious APK File": If there exist other APK files within the package, those included APK files are analyzed separately (e.g., are added to the queue or checked with existing known malicious applications). If any of the included APK files are determined to malicious, the received APK is considered malicious as well.

3. "Hide Menu Icons": The menu icons are graphical elements placed in the options menu. If the received APK does not have the menu icons or attempt to hide the menu icons, it is suspicious.

4. "File Type Mismatch": If the received APK contains files whose formats do not match their extensions, it is highly suspicious (of maliciousness). For example, several Android malware families (e.g., Android.Droiddream family) attempt hide additional included APK files as database files by naming them with the ".db" extension rather than ".apk." As another example, a file labeled a ".png" may instead be an ".xml" file used for a command and control channel. As explained below, a developer may inadvertently misname a file (or otherwise misname a file without malicious intent).

5. "Contain Executable Files": If the received APK contains executables for the Linux platform (e.g. the .elf files), it is suspicious.

6. "Contain Malicious Executable Files": If the included executable files are known malicious files, e.g. known exploit libraries, the received APK is malicious.

7. "Install Other APK": If the received APK has the capacity of installing other APK files (e.g., while running in the background), it is suspicious.

8. "Uninstall Other APK": If the received APK has the capacity of uninstalling other APK files (e.g., while running in the background), it is suspicious.

9. "Contain Dangerous Shell Commands": If the received APK contains dangerous shell commands, e.g. chmod and su, it is malicious.

10. "Require Abnormal Permissions": If the received APK requires permissions such as "system debug," or "authenticate accounts," and/or factory adjustments such as setting process limits, it is suspicious.

11. "Contain Phone number": If the received APK contains phone number(s), it is suspicious (e.g., because the application may place calls or text messages to premium numbers).

12. "Contain URLs": If the received APK contains URL(s) within the source code, it is suspicious.

13. "Contain Malicious URL": Any URL(s) found are compared against a list of known malicious sites. If the URL(s) link to malicious site(s), the received APK is malicious.

14. "Send SMS": If the APK has the permission to send SMS messages, it is suspicious.

15. "Contain Autorun.inf file": If the received APK contains an autorun.inf file that is for Windows platform, it is malicious (e.g., because an attempt will be made by the user's computer to execute the file if the user connects the phone to the computer).

16. "Duplicate Entries": If the APK has duplicate entry names (e.g. containing two classes.dex files in the same folder within the APK) in the file, it is malicious. (E.g., because it is attempting to exploit the Android security vulnerability #8219321.

The static analysis engine stores the results of the rule testing a database (e.g., database 140) in the record associated with the application being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results.

In some cases, an application may appear "suspicious" to static analysis engine 306 due to poor programming choices made by a harmless programmer, rather than a malicious one. As one example, the programmer may have named an executable that handles playing of an MP3 file with a ".mp3" extension. This sort of filetype mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In some embodiments, static analysis engine 306 will conclude that the application will crash (and/or cause the virtual machine to crash) if executed. As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once the static analysis is complete, coordinator 304 locates an available dynamic analysis engine 310 to perform dynamic analysis on the application. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a mobile device emulator (e.g., running in a virtual machine). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the application has the ability to access GPS information, during dynamic analysis, various changes in location of the device will be simulated. However, if the application lacks the ability to access GPS information, in some embodiments no location changes will be simulated (reducing the amount of time/computing resources needed to complete dynamic analysis). As yet another example, dynamic analysis engine 310 will determine which emulator(s) to run based on the minimum operating system version number required by the application (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

The dynamic analysis engine/worker begins analysis by preparing and setting up the running environment for the application to be tested. Examples of operations carried out by the dynamic analysis engine/worker at this point include: (1) determining which system services should be started (e.g., simulated motion sensor readings and simulated location changes); and (2) determining what set of simulated user operations should take place (e.g., performed after installation, in sequence).

The dynamic analysis engine/worker loads an appropriate emulator (e.g., Android version 2.3) and installs the application to be analyzed. The emulators used by mobile malware analysis system 300 are instrumented. For example, they are configured to log activities as they occur in the emulator (e.g., using a customized kernel that supports hooking and logcat). Further, network traffic associated with the emulator is captured (e.g., using pcap).

The application is executed and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator and any resulting behaviors logged. In some embodiments the log data is stored as a temporary file on system 300.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Examples of features that can be detected during dynamic analysis include the following (where an example of "the received APK" is again "game.apk"):

1. "Connect To Unknown Websites": If the received APK attempts to connect to an unknown website (e.g., one that is not on a whitelist of known safe websites), it is suspicious.

2. "Connect To Malicious Websites": If the received APK attempts to connect to a known malicious websites, it is malicious.

3. "Add Malicious Bookmarks": If the received APK attempts to add a known malicious website to the bookmarks of a browser, it is malicious.

4. "Install Other APK": If the received APK attempts to install other APK files, it is malicious. The APK to be installed can either be included within the original (received) APK file, or downloaded by the received APK from a remote server.

5. "Uninstall Other APK": If the received APK attempts to uninstall other installed apps, it is malicious.

6. "Uninstall Itself": If the received APK attempts to uninstall itself after installation, it is malicious.

7. "Send SMS In Background": If the received APK attempts to send SMS messages while running in the background, it is malicious.

8. "Insert SMS To Inbox": If the received APK attempts to insert an SMS message into the Inbox (e.g., while running in the background), it is malicious.

9. "Delete SMS from Inbox": If the received APK attempts to delete one or more SMS messages present in the Inbox, it is malicious.

10. "Send SMS To Contacts": If the received APK attempts to send multiple contacts automatically, it is malicious.

11. "Auto Reply SMS": If the received APK attempts to send an SMS upon receving an SMS, it is malicious.

12. "Add APN Settings": If the received APK attempts to insert new APN settings, it is suspicious.

13. "Call Sensitive Service": If the received APK attempts to call sensitive system services or execute dangerous shell commands (e.g. the "mount" command), it is malicious.

14. "Load Malicious File": If the received APK loads one or more files when running, the loaded files will be checked separately. If the loaded files are malicious, then the received APK is malicious.

15. "Create APK Files": If the received APK attempts to save other APK files in one of the system folders (e.g., "/system/app" or "/data/app"), it is suspicious. The saved APK files will be checked separately.

16. "Create Malicious File": If the received APK attempts to create a file with a sensitive file type, such as .elf or autorun.inf, it is malicious.

17. "Access Hidden Folder Or Files": If the received APK attempts to create or access hidden folders or files on the local storage and outside its own local storage folder, it is malicious. An example of a hidden folder is "./.hidden/."

18. "Change File Permission": If the received APK attempts to change the default permissions of local files to "executable," and this file has not been checked in static analysis or has been checked as malicious in static analysis, it is malicious.

As with the static analysis engine, the dynamic analysis engine stores the results of the rule testing in the database in the record associated with the application being tested (and/or includes the results in report 312 as applicable). In some embodiments, the dynamic analysis engine also forms a verdict with respect to the application (e.g., safe, suspicious, or malicious). As one example, the verdict can be "malicious" if even one "malicious" dynamic feature is present in the application. As another example, points can be assigned to each of the features (e.g., based on severity if found; based on how reliable the feature is for predicting malice; etc.) and a verdict can be assigned by dynamic analysis engine 306 (or the coordinator, if applicable) based on the number of points associated with the static analysis results.

In some embodiments, a final verdict associated with the application is assessed (e.g., based on a combination of report 308 and report 312) by coordinator 304.

Example Process

Figure 4:
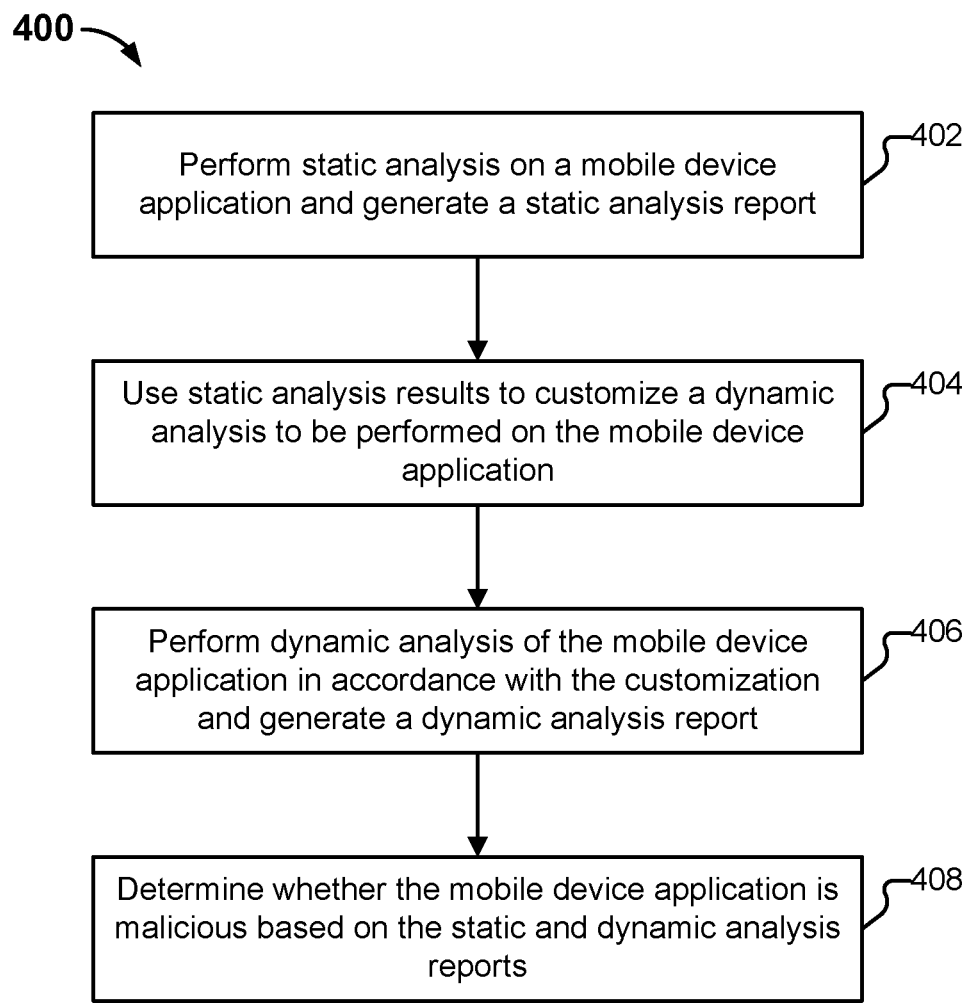
FIG. 4 illustrates an embodiment of a process for determining whether a mobile device application is malicious.

FIG. 4 illustrates an embodiment of a process for determining whether a mobile application is malicious. In various embodiments, process 400 is performed by mobile malware analysis system 300. The process begins at 402 when static analysis is performed on a mobile malware application. As one example, static analysis is performed on an application, such as "game.apk" by a static analysis engine 306 at 402. Suppose "game.apk" is malicious and will delete all of the SMSes in a user's Inbox if the device it is running on receives an SMS from ChinaMobile's service number (e.g. "10086"). The application does this to hide notifications pertaining to phone billing from the end user. During static analysis, a determination would be made that the game.apk application has access to SMS content. This capability of the application (along with other information, examples of which are provided above) is included in a static analysis report by the static analysis engine. At 404, the static analysis report is used to customize a dynamic analysis to be performed on the mobile device application. As one example, since the application has access to SMS content, the dynamic analysis will be customized to include sending a variety of SMS messages. Other device resources to which the application does not have access (e.g., GPS location information) will not be simulated and thus can be excluded from the customized dynamic analysis plan. At 406, dynamic analysis of the application is performed using a dynamic analysis engine. One example of the dynamic analysis performed includes sending SMSes appearing to originate from a variety of sources, including 10086 (i.e., the service number of ChinaMobile) to the emulator. Sending such an SMS is an example of an "external event" (as is a simulated location change)—contrasted with an "internal event" (e.g., where button presses or file opens/closes are simulated). When game.apk deletes the SMS Inbox upon receiving the simulated incoming SMS from ChinaMobile, the game.apk's actions will be captured and logged. The dynamic analysis engine will examine the logged behavior in conjunction with creating a dynamic analysis report—and determine that the application has taken a malicious action with respect to SMS messages. Finally, at 408 a determination is made as to whether the mobile device application is malicious, based on the static and dynamic analysis reports. In this example, coordinator 304 examines the static analysis report (concluding that the application is "suspicious") and dynamic analysis report (concluding the application is "malicious") and determines that game.apk is malicious.

In some cases, static analysis engine 306 might conclude an application is malicious, while dynamic analysis engine 310 might conclude the application is merely suspicious. In various embodiments, the final decision rendered by the mobile malware analysis system 300 uses the more severe of the two assessments (e.g., concluding the application is malicious based on the static analysis report). In various embodiments, the final verdict is determined by coordinator 304 assigning points to each of the features triggered by the application (i.e., both the static features and the dynamic features). If the score exceeds a threshold, the application is determined to be malicious. More sophisticated scoring rubrics can also be used in conjunction with the techniques described herein, such as ones which weight dynamic analysis results more heavily than static analysis results.

In some embodiments, coordinator 304 (or another appropriate component) is configured to revise one or more heuristics based on process 400. As one example, static analysis engine 306 might determine that a given application is configured to send an SMS message, but static analysis engine 306 is unable to determine whether the SMS is in fact malicious (e.g., to a 900 number). One reason static analysis engine 306 might not know that the SMS is malicious is because the number is encoded in a way not previously seen by system 300. Another reason static analysis engine 306 might not know the SMS is malicious is because the number is fetched from a URL included in the application (but not known to system 300 to be a malicious URL). During dynamic analysis of the application, a determination might be made that the number to which the SMS is sent is in fact malicious (e.g., by comparing log information against a collection 314 of malicious/premium numbers). The static analysis rules can be revised to indicate that, in the future, if the encoded information representing the 900 number is encountered in any new applications, those applications are malicious (rather than suspicious). As another example, collection 314 can be refined to include the URL as known malicious. When a future application is evaluated by static analysis engine 306 that includes the URL, the static analysis engine will conclude that the application is malicious (instead of suspicious) based on the presence of the URL in collection 314.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
a processor configured to:
perform static analysis on a mobile device application using a static analysis engine to generate a set of static analysis results, wherein the static analysis results include a set of permissions granted to the mobile device application and further include a minimum operating system version number required by the mobile device application to execute;
select, by a dynamic analysis engine, a particular emulator from a plurality of emulators each meeting the minimum operating system version requirement of the mobile device application, wherein the selection is based at least in part on the minimum operating system version number included in the static analysis results;
selectively customize how the dynamic analysis engine will perform dynamic analysis of the mobile device application, using the set of permissions granted to the mobile device application, wherein in the event a first permission is included in the set of permissions granted to the mobile device application, a type of dynamic analysis associated with the first permission will be selected for performing during dynamic analysis of the mobile device application, and wherein in the event the first permission is not included in the set of permissions granted to the mobile device application, the type of dynamic analysis associated with the first permission will not be selected for performing during dynamic analysis of the mobile device application;
perform the customized dynamic analysis of the mobile device application using the dynamic analysis engine; and
assign a final maliciousness verdict to the application based at least in part on an evaluation of one or more static analysis results and an evaluation of one or more dynamic analysis results; and
a memory coupled to the processor and configured to provide the processor with instructions.

2. The system of claim 1 wherein performing static analysis includes reversing the mobile device application into an intermediate source code form.

3. The system of claim 1 wherein performing static analysis includes determining the presence of a filetype mismatch.

4. The system of claim 1 wherein performing dynamic analysis includes emulating a mobile device and wherein performing dynamic analysis further includes simulating an event external to the simulated mobile device.

5. The system of claim 4 wherein the simulated event comprises a simulated location change.

6. The system of claim 4 wherein the simulated event comprises a simulated transmission of a message to the simulated mobile device from a simulated entity.

7. The system of claim 1 wherein performing at least one of static and dynamic analysis includes determining that a deletion action is taken in response to receipt of message appearing to have been sent by a carrier.

8. The system of claim 1 wherein the static analysis results include at least one indication that a feature of the mobile device application is suspicious which warrants additional investigation during dynamic analysis, and wherein the dynamic analysis engine is configured to determine whether the feature identified as suspicious during static analysis is malicious.

9. The system of claim 1 wherein the processor is further configured to report the determination to a data security appliance.

10. The system of claim 1 wherein the mobile device application has a location permission and wherein a location-type dynamic analysis is selected for performing during dynamic analysis of the mobile device application.

11. The system of claim 1 wherein the mobile device application lacks a message access permission and wherein a messaging-type dynamic analysis is not selected for performing during dynamic analysis of the mobile device application.

12. A method, comprising:
performing static analysis on a mobile device application using a static analysis engine to generate a set of static analysis results, wherein the static analysis results include a set of permissions granted to the mobile device application and further include a minimum operating system version number required by the mobile device application to execute;
selecting, by a dynamic analysis engine, a particular emulator from a plurality of emulators each meeting the minimum operating system version requirement of the mobile device application, wherein the selection is based at least in part on the minimum operating system version number included in the static analysis results;
selectively customizing how the dynamic analysis engine will perform dynamic analysis of the mobile device application, using the set of permissions granted to the mobile device application, wherein in the event a first permission is included in the set of permissions granted to the mobile device application, a type of dynamic analysis associated with the first permission will be selected for performing during dynamic analysis of the mobile device application, and wherein in the event the first permission is not included in the set of permissions granted to the mobile device application, the type of dynamic analysis associated with the first permission will not be selected for performing during dynamic analysis of the mobile device application;
performing the customized dynamic analysis of the mobile device application using the dynamic analysis engine; and
assigning a final maliciousness verdict to the application based at least in part on an evaluation of one or more static analysis results and an evaluation of one or more dynamic analysis results.

13. The method of claim 12 wherein performing static analysis includes reversing the mobile device application into an intermediate source code form.

14. The method of claim 12 wherein performing static analysis includes determining the presence of a filetype mismatch.

15. The method of claim 13 wherein performing dynamic analysis includes emulating a mobile device and wherein performing dynamic analysis further includes simulating an event external to the simulated mobile device.

16. The method of claim 15 wherein the simulated event comprises a simulated location change.

17. The method of claim 15 wherein the simulated event comprises a simulated transmission of a message to the simulated mobile device from a simulated entity.

18. The method of claim 13 wherein performing at least one of static and dynamic analysis includes determining that a deletion action is taken in response to receipt of message appearing to have been sent by a carrier.

19. The method of claim 12 further comprising reporting the determination to a data security appliance.

20. The method of claim 12 wherein the mobile device application has a location permission and wherein a location-type dynamic analysis is selected for performing during dynamic analysis of the mobile device application.

21. The method of claim 12 wherein the mobile device application lacks a message access permission and wherein a messaging-type dynamic analysis is not selected for performing during dynamic analysis of the mobile device application.

22. The method of claim 12 wherein the static analysis results include at least one indication that a feature of the mobile device application is suspicious which warrants additional investigation during dynamic analysis, and wherein the dynamic analysis engine is configured to determine whether the feature identified as suspicious during static analysis is malicious.

23. A computer program product embodied in a non-transitory computer readable storage medium and comprising computer instructions for:
   performing static analysis on a mobile device application using a static analysis engine to generate a set of static analysis results, wherein the static analysis results include a set of permissions granted to the mobile device application and further include a minimum operating system version number required by the mobile device application to execute;
   selecting, by a dynamic analysis engine, a particular emulator from a plurality of emulators each meeting the minimum operating system version requirement of the mobile device application, wherein the selection is based at least in part on the minimum operating system version number included in the static analysis results;
   selectively customizing how the dynamic analysis engine will perform dynamic analysis of the mobile device application, using the set of permissions granted to the mobile device application, wherein in the event a first permission is included in the set of permissions granted to the mobile device application, a type of dynamic analysis associated with the first permission will be selected for performing during dynamic analysis of the mobile device application, and wherein in the event the first permission is not included in the set of permissions granted to the mobile device application, the type of dynamic analysis associated with the first permission will not be selected for performing during dynamic analysis of the mobile device application;
   performing the customized dynamic analysis of the mobile device application using the dynamic analysis engine; and
   assigning a final maliciousness verdict to the application based at least in part on an evaluation of one or more static analysis results and an evaluation of one or more dynamic analysis results.

\* \* \* \* \*

UNITED STATES PATENT AND TRADEMARK OFFICE
CERTIFICATE OF CORRECTION

PATENT NO. : 10,867,041 B2
APPLICATION NO. : 16/005441
DATED : December 15, 2020
INVENTOR(S) : Zhi Xu, Xinran Wang and Huagang Xie Page 1 of 1

It is certified that error appears in the above-identified patent and that said Letters Patent is hereby corrected as shown below:

On the Title Page

In page 3, Column 2, item (56), other publications, cite no. 17, delete "Int" and insert --Inf--, therefor.
In page 4, Column 1, item (56), other publications, cite no. 20, delete
"http://www.fireeye.com/products-and-solutionsivirtual-execution-engine.html" and
insert --http://www.fireeye.com/products-and-solutions/virtual-execution-engine.html-- therefor.
In page 4, Column 2, item (56), other publications, cite no. 6, delete "Chapter 4: Guarding Against
Network Intrusions," and insert --'Chapter 4: Guarding Against Network Intrusions,'--, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*